United States Patent [19]
Stucchi et al.

[11] Patent Number: 5,592,970
[45] Date of Patent: Jan. 14, 1997

[54] QUICK-COUPLING FITTING FOR PIPES PROVIDED WITH A SAFETY VALVE

[75] Inventors: Giovanni Stucchi, Treviglio; Gianmarco Gatti, Pognano, both of Italy

[73] Assignee: Stucchi s.r.l., Italy

[21] Appl. No.: 463,057

[22] Filed: Jun. 5, 1995

[30] Foreign Application Priority Data

Jun. 8, 1994 [IT] Italy ................. MI94A01190

[51] Int. Cl.$^6$ .................................. F16L 37/28
[52] U.S. Cl. ........................................ 137/614.03
[58] Field of Search .................. 137/614.05, 614.03, 137/614.04, 614, 614.02; 251/149.6

[56] References Cited

U.S. PATENT DOCUMENTS

| | | | |
|---|---|---|---|
| 3,464,436 | 9/1969 | Bruning | 137/614.03 X |
| 4,742,850 | 5/1988 | Ekman | 137/614.03 X |
| 5,063,965 | 11/1991 | Wilcox | 137/614.04 X |
| 5,123,446 | 6/1992 | Haunhorst et al. | 137/614.03 X |
| 5,191,914 | 3/1993 | Gonzalez . | |
| 5,443,291 | 8/1995 | Stucchi et al. | 137/614.03 X |

FOREIGN PATENT DOCUMENTS 0542342  5/1993  European Pat. Off. .
0580233  1/1994  European Pat. Off. .

*Primary Examiner*—Kevin Lee
*Attorney, Agent, or Firm*—Sixbey, Friedman, Leedom & Ferguson, P.C.; Gerald J. Ferguson, Jr.; Tim L. Brackett, Jr.

[57] ABSTRACT

A quick-coupling fitting for pipes comprises a female element and a male element that can be coupled together, formed by fixed parts and axially sliding parts. The fitting is provided with a valve apt for intercepting a communication port between a conduit and a passage port for the fluid in the initial stages of the coupling action and for opening it in the final stages of the coupling action. A seal of a fixed internal casing is covered by a sliding bush whatever is the axial position assumed by the bush during the initial and final stages of the coupling action.

8 Claims, 8 Drawing Sheets

QUICK-COUPLING FITTING FOR PIPES PROVIDED WITH A SAFETY VALVE

DESCRIPTION

The present invention relates to a quick-coupling fitting for pipes, provided with a safety valve.

In the transmission of fluids it is often necessary to have fittings available that can be coupled quickly to connect flexible or rigid pipes, in turn connected to a supply of fluid and to a user.

Known quick-coupling fittings are generally constituted by two elements, male and female, fitted to respective pipes to be connected and connectable by screwing or by snap-on means.

According to a currently known art the female element has a structure comprising an internal casing inserted at one end in an internally threaded nut for connecting either to the supply or to the user and an external casing coaxial with said internal casing.

The internal casing supports a valve element constituted by a fixed axial internal stem with an enlarged end. On the outside of the latter, concentrically, there is fitted, so as to leave an intermediate space in between, a sealing bush that, under the elastic action of positioning springs and by means of the engagement with the enlarged end of the stem, completely prevents the passage of fluid in the intermediate space in the absence of coupling with the male element.

Concentrically with and externally to the bush, there is a unit for cleaning the same constituted by a sliding cup with a corresponding positioning spring.

To the internal casing, between it and a rearward portion of the axial stem, there is constrained an annular element with spokes in which six holes of a small diameter are drilled for the passage of the fluid. As an alternative, with the object of avoiding the turbulence associated with the presence of small-diameter holes, such annular element can be provided with at least two passage ports in the shape of an annular sector one after the other, interspaced by narrow spokes, along a circumference of said annular element.

The male element generally comprises an external casing provided with means for coupling up with the female element at one end, an internal casing and an internally-threaded nut at the other end for coupling up with the supply or the user. Inside said casing, in a concentric position such as to leave an intermediate space in between, there is a piston urged by corresponding positioning springs in a front-closing position of the intermediate space itself.

During the coupling action between the female fitting and the male fitting, the sliding cup of the female element is driven by the external casing of the male element and, during its translation, it carries the bush along with it against the force exerted by the positioning spring corresponding to it. At the same time the piston of the male element is urged to return inside the external casing of the male element itself against the force of the corresponding positioning spring to a position where the intermediate space is open.

As regards the coupling action between the male and female element of the fitting, this can be obtained by means of snap-on coupling means or by screwing, using appropriate threads on the outside of the female element and inside a terminal cavity of the male element.

A fitting of the type described above has formed the object of the European patent application EP-0580233 filed in the name of the same Applicant.

In this fitting the operating pressures of the service fluid in the pipe are high; maximum values vary from 180 bar to 600 bar, according to the type of use. During the coupling action, it can occur that an element, for example the male element, is under pressure, and the other, the female element, is not. Inside the fitting a difference in pressure can take place that is so high that it can jeopardise the internal seals remaining in their seat. This takes place, in particular, in the case of a seal housed in a seat of the internal casing of a male element under pressure engaged with the bush of a female element not under pressure. In fact, since the seat of the seal is usually at some distance from the end of the male element faciong the bush, it can happen that the seal remains uncovered and is exposed to the flow of fluid under pressure during the axial translation made by the internal casing to engage with the bush, especially if the difference in pressure causes a displacement of the bush in the opposite direction. Due to the high difference in pressure, the seal is subjected to such stresses that it is torn from its seat. The consequent loss of the sealing action between the internal casing and the bush causes losses and leaks of fluid through the fitting.

The object of the present invention is to provide a quick-coupling fitting of the type described above, that is capable of guaranteeing the seal even under coupling conditions such as those described above.

According to the invention, such object is attained by means of a quick-coupling fitting comprising a female element and a male element that can be coupled together, which elements are formed by fixed parts and axially sliding parts that when at rest are arranged in a closed position of a passage port for the fluid and on the occasion when the two elements are coupled together are displaced by engagement with corresponding parts of the other element in a position where said passage port is open, said sliding parts of the female element comprising a bush that is axially sliding and elastically urged toward said closed position and said fixed parts of the male element comprising a fixed internal casing provided with a seal that can be covered by said bush of the female element on the occasion of said coupling action, characterised in that said male element comprises valve means apt for intercepting a supply conduit of said passage port of fluid in the initial stages of said coupling action and apt for opening a communication port between said conduit and said passage port in the final stages of said coupling action, and said seal is housed in a seat located in the proximity of one end of said internal casing facing said bush, so that said seal is covered by said bush whatever is the axial position assumed by said bush during said initial and final stages of said coupling action.

The presence of valve means and the positioning of the seal in a seat near the end of the internal casing of the male element prevent the seal from being exposed to dangerous stresses due to possible high differences in pressure between the two elements, because the passage of fluid through the fitting is allowed only when the seal is sure to be covered and protected by the bush. In fact, the seal remains protected by the bush even if the bush moves backward temporarily due to the effect of the high differences in pressure. Thus, the seal remains in its seat and carries out its function correctly even under particular conditions of coupling action, when the male element is under pressure and the female element is not, without there being any losses and leaks of fluid from the fitting.

These and other features of the present invention will be made more evident by the following detailed description of an embodiment thereof, illustrated as a non-limiting example in the enclosed drawings, wherein.

Figure 1:
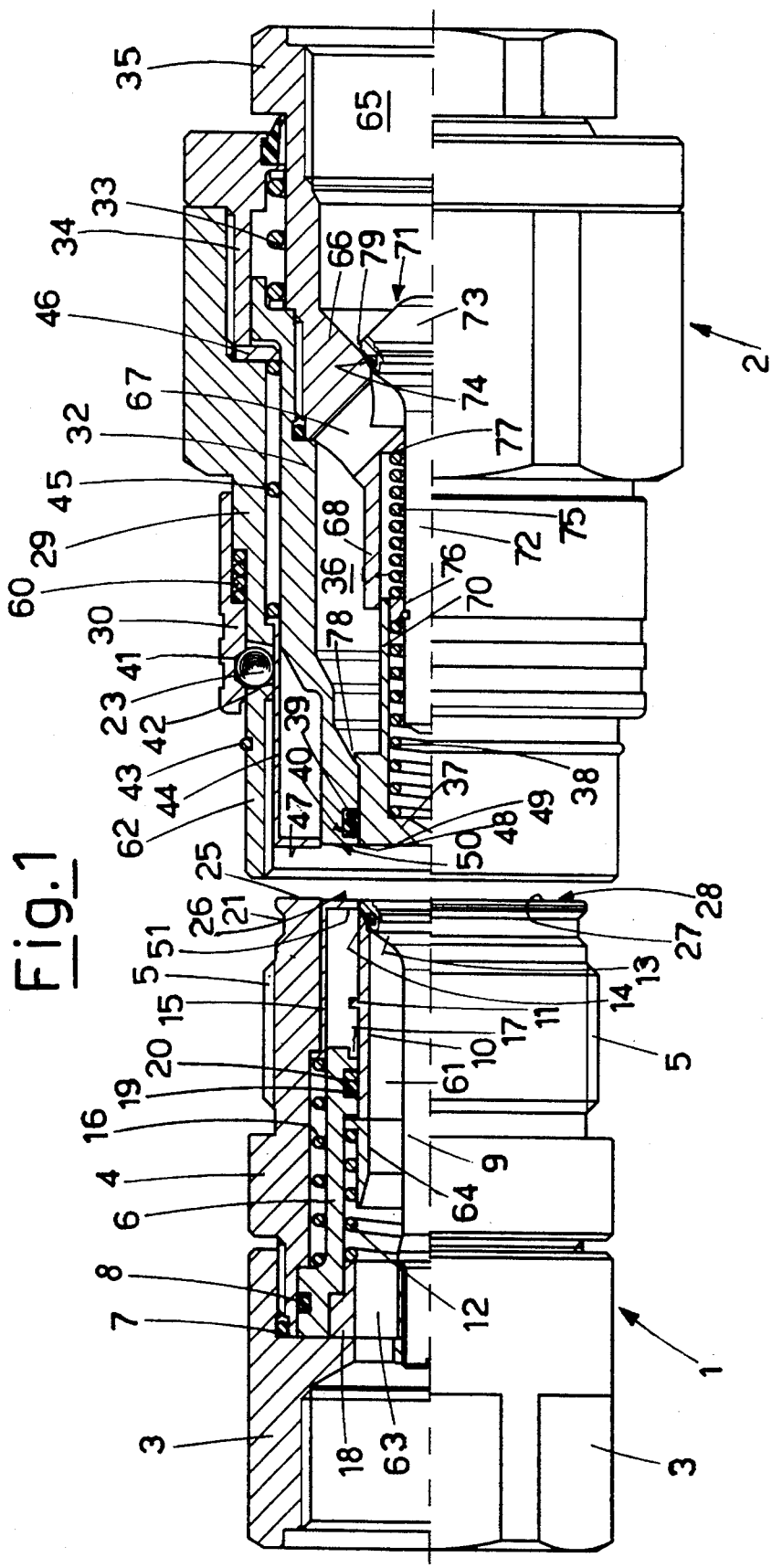
FIG. 1 is a front view, partially sectioned longitudinally, of a female element and of a male element of a fitting according to the invention.

With reference to FIG. 1, the fitting according to the invention is constituted by a female element 1 and by a male element 2.

The female element 1 comprises, rigidly clamped together, a nut 3 provided with an internal thread for coupling to a supply of fluid or to a user, an external casing 4 screwed into said nut 3 at one end, a fixed annular base 18 with several ports 63 for the passage of the fluid and an internal casing 6, arranged concentrically with respect to the external casing 4. The perfect seal between said external casing 4 and said nut 3 is guaranteed by a seal 7.

The annular base 18 supports a fixed axial inner stem 9. Externally to and concentrically with the stem 9, so as to leave an intermediate space 61, there is an axially sliding sealing bush 10, provided with protruding elements 11; under conditions at rest, with the fitting open, said sealing bush 10 is urged, in the axial direction, by a spring 12 that drives said bush 10 toward the right, through a sleeve 64; the engagement with an enlarged end 13 of the stem 9 balances the force exerted by the spring 12 and keeps the bush 10 in a condition of equilibrium.

With the enlarged end 13 of the stem 9 there is associated a seal 14 that prevents the passage of the fluid under conditions at rest.

Concentrically with and externally to the sealing bush 10 and inside the external casing 4, there is a unit for cleaning the bush itself, formed by a cup 15, provided with a transversal terminal element 51, axially sliding on the external surface of said internal casing 6 and urged by a positioning spring 16.

The internal casing 6, with spaces 17 for receiving the protruding elements 11 of the sealing bush 10, has a contact surface with the external casing 4 provided with a seal 8 and a contact surface with said sealing bush 10 provided with a further seal 19 and with an antiextrusion device 20.

The external casing 4, at the end at which it is coupled with the male element 2, has an external thread 5. It also, again on its own external surface, has an annular space 21 for receiving a circumferential succession of balls 23 carried by the male element 2.

The terminal surfaces 25, 26 and 27 of the external casing 4, of the cup 15 and of the axial stem 9, respectively, are arranged to form a flat surface indicated globally with 28.

The male fitting element 2 comprises an external casing 29, an internal casing 32, arranged concentrically to said external casing 29, a terminal nut 35 screwed into the internal casing 32, provided with a conduit 65 for connecting to a supply or to a user, and a supporting element 34, screwed into the external casing 29 and sliding on the external surface of the terminal nut 35 under the action of a spring 33. The nut 35 is provided with a frustum-shaped shoulder 66, having several ports 67 passing through it for the passage of the fluid, and with a tubular element 68. The nut 35 and the internal casing 32, that constitute fixed parts of the male element 2, define inside them a cavity 36 for the passage of the fluid, wherein there is housed a piston 37 urged by a spring 38 in an axial direction. The seal between the internal casing 32 and the piston 37 is guaranteed by a seal 40, formed by an elastic ring and by an O-ring, that is housed in an annular seat 39 of the casing 32. The seat 39 is in the proximity of an end surface 48 facing the bush 10. The seat 39 is located at a predetermined minimum distance from the end surface 48, for example equal to 0.5 mm or even less. The piston 37 remains in contact with the internal casing 32 so as to close a port for the passage of the fluid 78 between cavity 36 and space 61.

The piston 37 has a skirt 70 that is slidably supported axially in the tubular element 68. Coaxial with the skirt 70 there is a mushroom valve 71 provided with a stem 72 and with a head 73, having an annular seal 74 (that can, however, be replaced with an appropriate metal-to-metal seal). The valve 71 is kept up against the frustum-shaped shoulder 66 by a spring 75, so as to intercept a passage port 79 between the conduit 75 and the cavity 36. The spring 75 is interposed between an annular projection 76 fastened to the stem 72 and a striker wall 77 of the tubular element 78. The spring 38 acting on the piston 37 is also engaged with the annular projection 76 of the stem 75.

In the intermediate space between the external casing 29 and the internal casing 32 there is a cup 44 urged by a positioning spring 45 acting up against a ring 46 held between the external casing 29 and the supporting element 34.

The external casing 29 has an internally-threaded terminal portion 62. In a more backward position, it also supports a ring nut 30, provided with a positioning spring 60 and sliding on the external surface of said terminal portion 62 of the external casing 29. In the proximity of the ring nut 30 the terminal portion 62 has externally an elastic ring 43, whose functions will appear clear later.

On the internal surface the ring nut 30 has an annular notch 41 apt for defining, in the position at rest shown in FIG. 1 and jointly with a corresponding succession of holes 42 of the external casing 29, respective spaces for receiving the balls 23 for fastening said male 2 and female 1 elements.

The terminal surfaces 47, 48 and 49 of the cup 44, of the internal casing 32 and of the piston 37, respectively, are arranged so as to form a flat surface indicated globally with 50.

Beginning with the position at rest of the two female 1 and male 2 elements of the fitting according to the invention, illustrated in FIG. 1, the coupling action is executed as follows.

Figure 2:
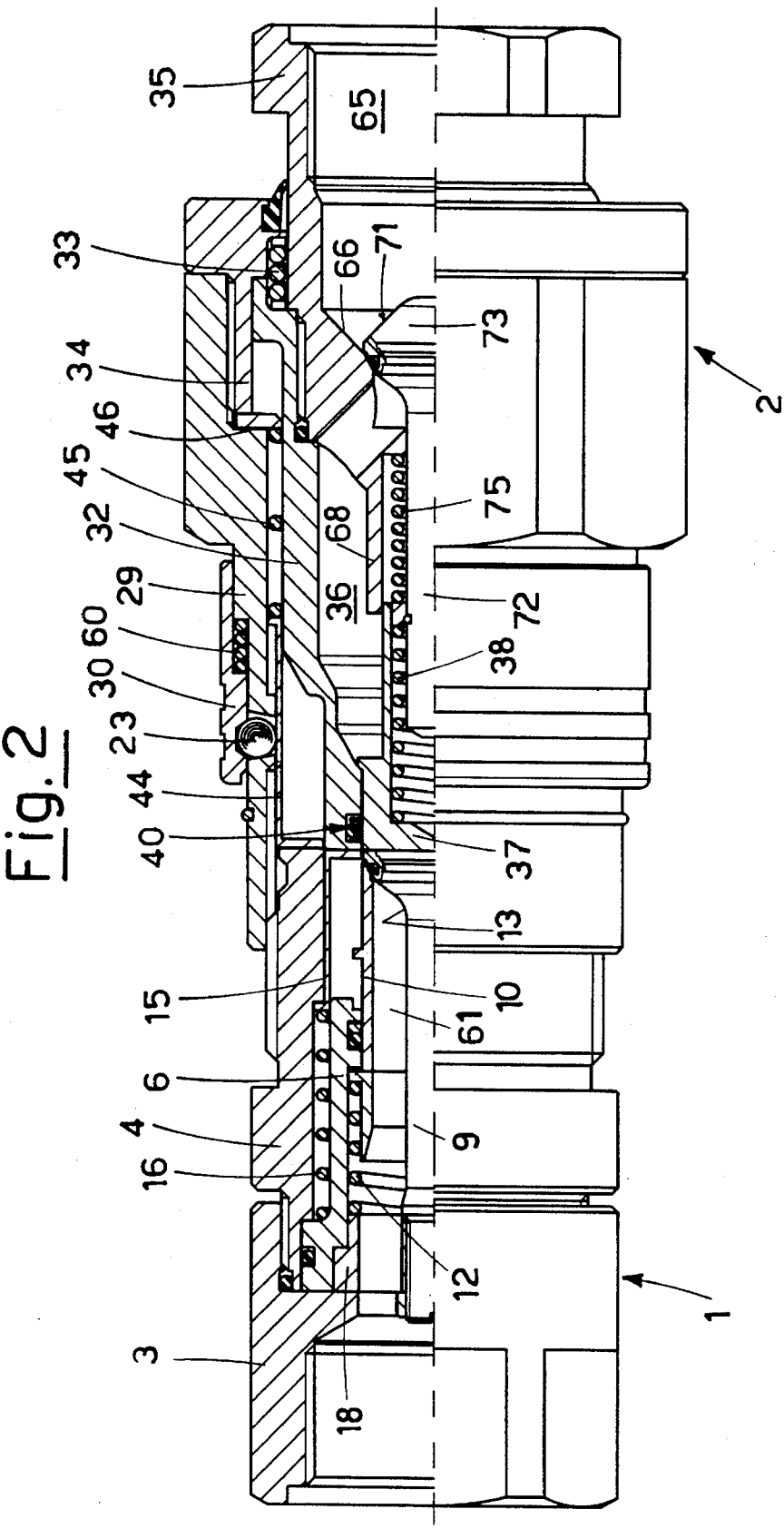
FIG. 2 is a front view, partially sectioned longitudinally, of the fitting according to the invention, in a first stage of the coupling movement.

With reference to FIG. 2, the coupling of the fitting starts with the elements 1 and 2 being brought together so that the respective surfaces 28 and 50 are placed in contact. In particular the surface 27 of the enlarged end 13 of the stem 9 is placed in contact with the surface 49 of the piston 37, the surface 26 of the vertical element 51 of the cup 15 is placed in contact with the terminal surface 48 of the internal casing 32 of the male element 2 and lastly the surface 25 of the external casing 4 is placed in contact with the surface 47 of the cup 44.

The first stage of the coupling action then provides for the start of the screwing action of the terminal threaded portion 62 of the external casing 29 of the male element 2 on the corresponding threaded portion 5 of the external casing 4 of said female element 1. Such screwing action causes in the first place the displacement toward the left, with respect to the at rest position, of the external casing 29, sliding on the internal casing 32, and of the support 34, sliding on the nut 35. The motion of the support 34 causes a compression of the spring 33 and, at the same time, it involves in the motion the ring 46 that urges the spring 45 to compression.

During this first stage the passage of the fluid inside the fitting is prevented on the basis of the fact that the intermediate space 61 of the female element 1 is closed due to the engagement between the bush 10 and the enlarged end 13 of the stem 9, the cavity 36 of the male element 2 is closed by the piston 37 and the conduit 65 is closed by the valve 71.

Figure 3:
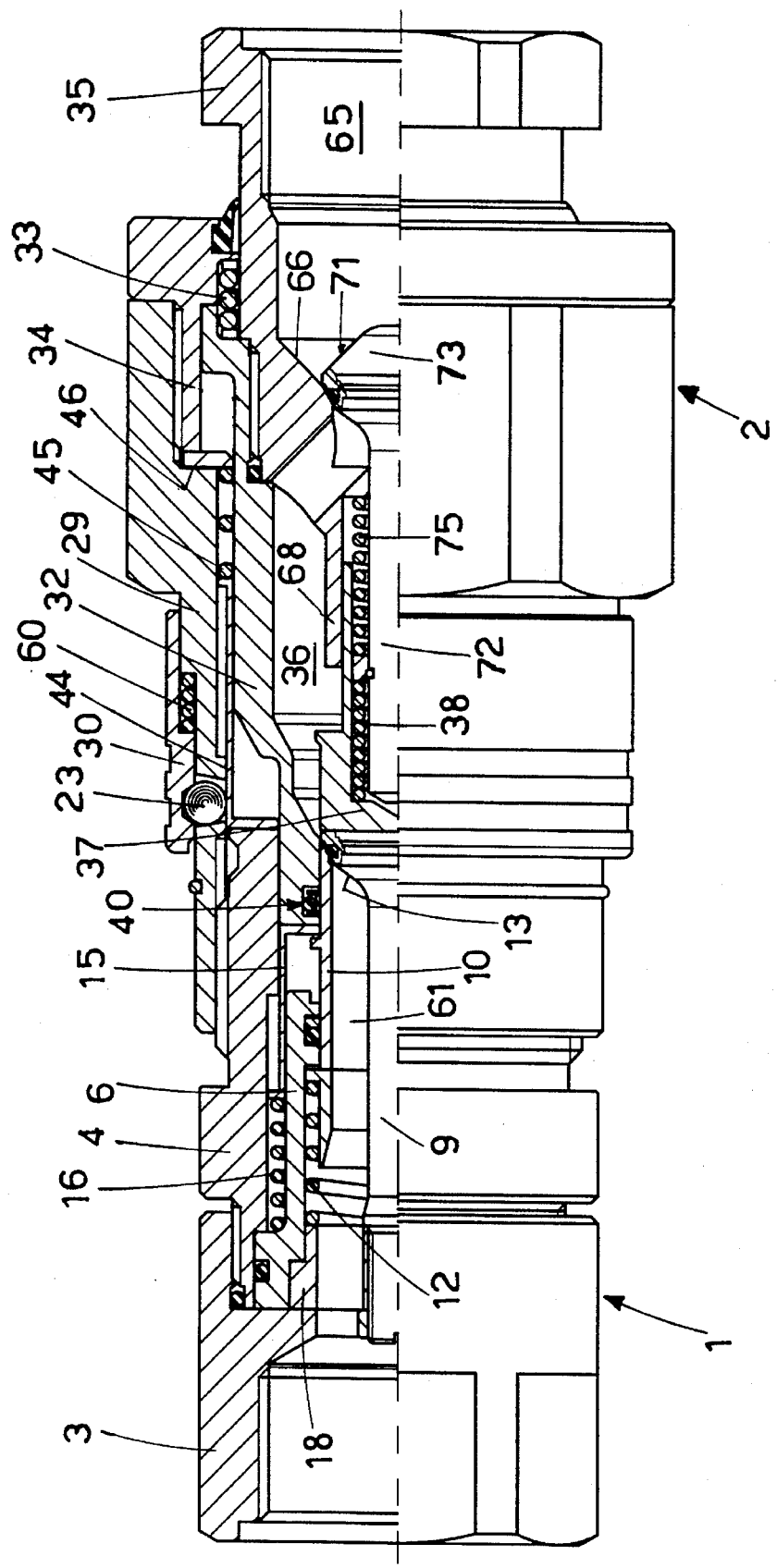
FIG. 3 is a front view, partially sectioned longitudinally, of the fitting according to the invention, in a second stage of the coupling movement.

With reference to FIG. 3, the second stage of the coupling action consists in the continuation of the screwing up operations.

The external casing 29 and its terminal portion 62 continue to advance toward the left. The attainment of the position of maximum compression of the spring 33 makes the support 34 perfectly integral with the external casing 32 that, as a consequence, is driven toward the left, against the action of the spring 16 that urges the cup 15 in contact with said casing 32. The cup 15 moves toward the left, approaching the protruding elements 11 of the bush 10, and the spring 16 is, thus, compressed as a result of the displacement of said cup 15.

The internal casing 32, translating toward the left, disengages itself from the piston 37 and engages the bush 10 taking the seal 40 into contact with the bush itself. Since the seat 39 is at a minimum distance from the end wall 48 of the casing 32, with a small axial displacement of the casing 32 the seal 10 is covered and protected by the bush 10 already during the initial stages of screwing up the fitting. The bush 10, through the engagement with the enlarged end 13 of the stem 9, continues to keep the passage port 78 closed between cavity 36 and intermediate space 61.

The relative motion between the internal casing 32 and the stem 9, that remains fixed together with its enlarged end 13, brings the piston 37 to a position further to the rear in the male element 2, with the consequent compression of the corresponding positioning spring 38, while the valve 71, in the case of pressure in the conduit 65, continues to keep closed the communication port 79 between conduit 65 and cavity 36.

At the same time the cup 44, kept in contact with the external casing 4, urges a further compression of the spring 45.

Figure 4:
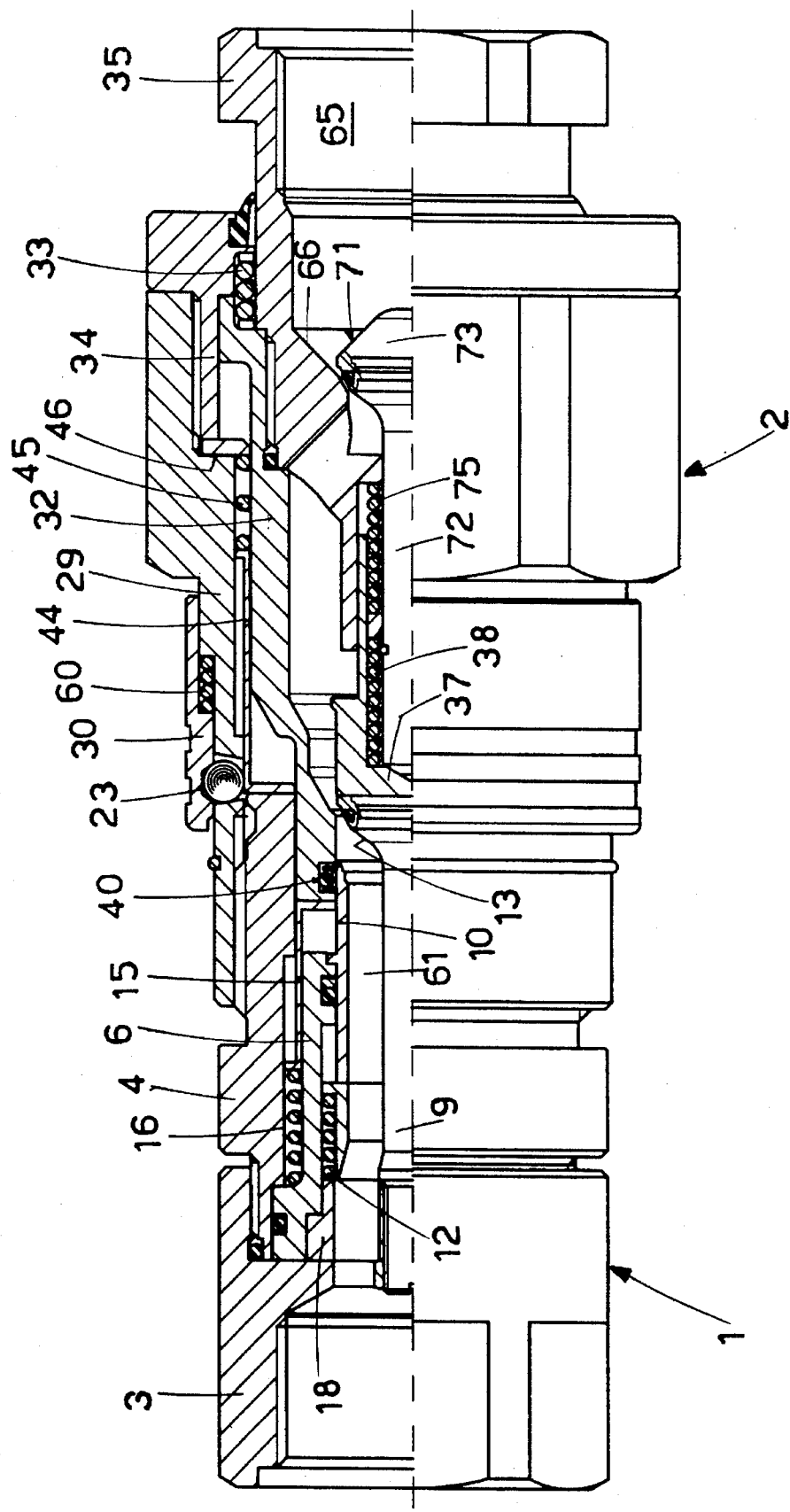
FIG. 4 is a front view, partially sectioned longitudinally, of the fitting according to the invention, in a third stage of the coupling movement.

With reference to FIG. 4, the third stage of the coupling consists in the further screwing up of the element 2 on the element 1.

The piston 37, due to the relative motion toward the left of the external casing 29 and of the internal casing 32, is now further to the rear with respect to the internal casing 32, with the consequent further compression of the positioning spring 38. Before the passage port 78 between cavity 36 and intermediate space 61 starts to open, the piston 37 comes into contact with the stem 72 of the valve 71 and drives it toward the right, compressing the valve 75 through the projection 76. The valve 71 thus starts to open the communication port 79 between conduit 65 and intermediate space 36, after which the passage port 78 is also open.

If the fluid in the conduit 65 is under pressure, while the intermediate space 61 is not, there is a very high difference in pressure that causes a movement toward the left of the bush 10, as shown in FIG. 4. It can be seen that even under these extreme conditions the seal 40 remains covered by the bush 10. Thus whatever the axial position of the bush 10 is during the final stages of the coupling of the fitting, the seal 40 remains covered by the bush itself.

Figure 5:
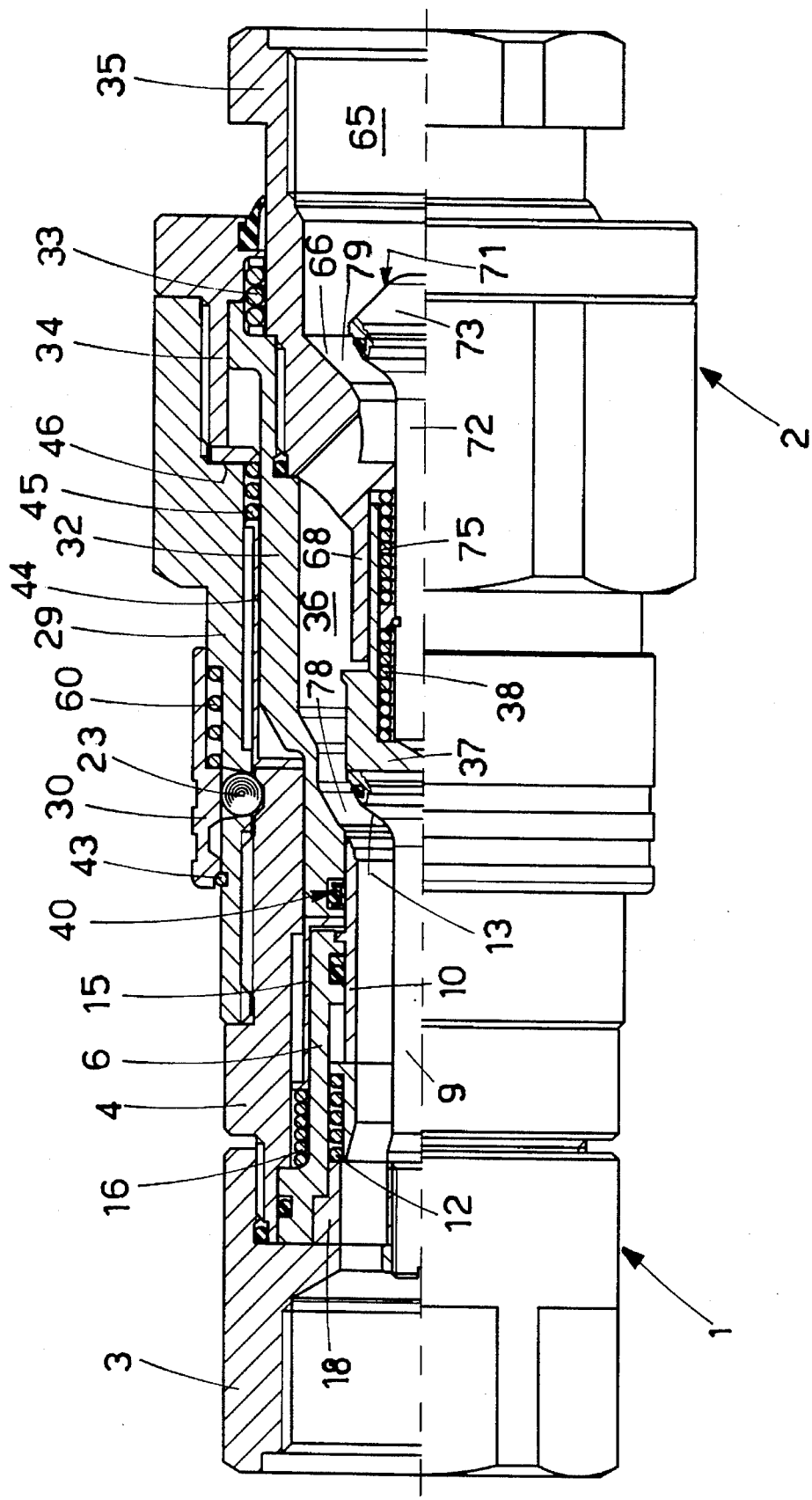
FIG. 5 is a front view, partially sectioned longitudinally, of the fitting according to the invention, as it appears after the two male and female elements are coupled and locked together.

With reference to FIG. 5, when the difference in pressure between the conduit 65 and the intermediate space 61 is eliminated, the bush 10 is driven by the spring 12 toward the right, so that the vertical structure 51 of the cup 15 returns in contact with the protruding elements 11, that act as a shoulder for the structure 51.

The last stage of the coupling action of the fitting consists in terminating the operations of screwing up the external casing 29 on the external casing 4, which brings the internal casing 32 to drive the cup 15 toward the left against the action of the spring 16. The casing 32, through the structure 51 and the protruding elements 11, causes the bush 10 to be displaced toward the left. Such displacement has as a consequence the complete opening of the passage port 78 between the cavity 36 and the intermediate space 61.

Moreover, the last stage of the screwing up of the external casing 29 brings the piston 37 to urge the stem 72 of the valve 71 toward the right, completely opening the communication port 79 as well. Since the passage port 78 and the communication 79 are both open, the fluid can flow through the entire fitting from the conduit 65 to the intermediate space 61.

A consequence of such further screwing up consists in reaching the maximum compression of the spring 45, urged by the cup 44 that is pushed toward the right in relation to the leftward motion of the internal casing 32 of the male element 2. In this position the external casing 29 and the internal casing 32 of the male element 2 are displaced toward the left by an amount such as to allow the balls 23 to be arranged opposite the annular receiving space 21 of the external casing 4 of the female element 1. The balls 23 protrude from the annular notch 41 of the ring nut 30 and penetrate inside the annular space 21, with the consequent positioning of the balls 23 at a radial distance that is smaller than that of the previous position. Thus, in such new position the balls 23 no longer prevent the relative motion of the ring nut 30 with respect to the terminal portion 62 of the external casing 29; as a consequence the spring 60, no longer constrained by the presence of the balls 23, urges the ring nut itself to slide along the terminal portion 62 until it reaches the elastic ring 43 that prevents any further movement toward the left of said ring nut; this thus remains in a position of equilibrium, clamping the balls 23 inside the space 21. Such positioning of the ring nut 30 thus allows the fitting to be locked completely in the coupled position and completes the operations for the assembly of the fitting itself (FIG. 5).

Figure 6:
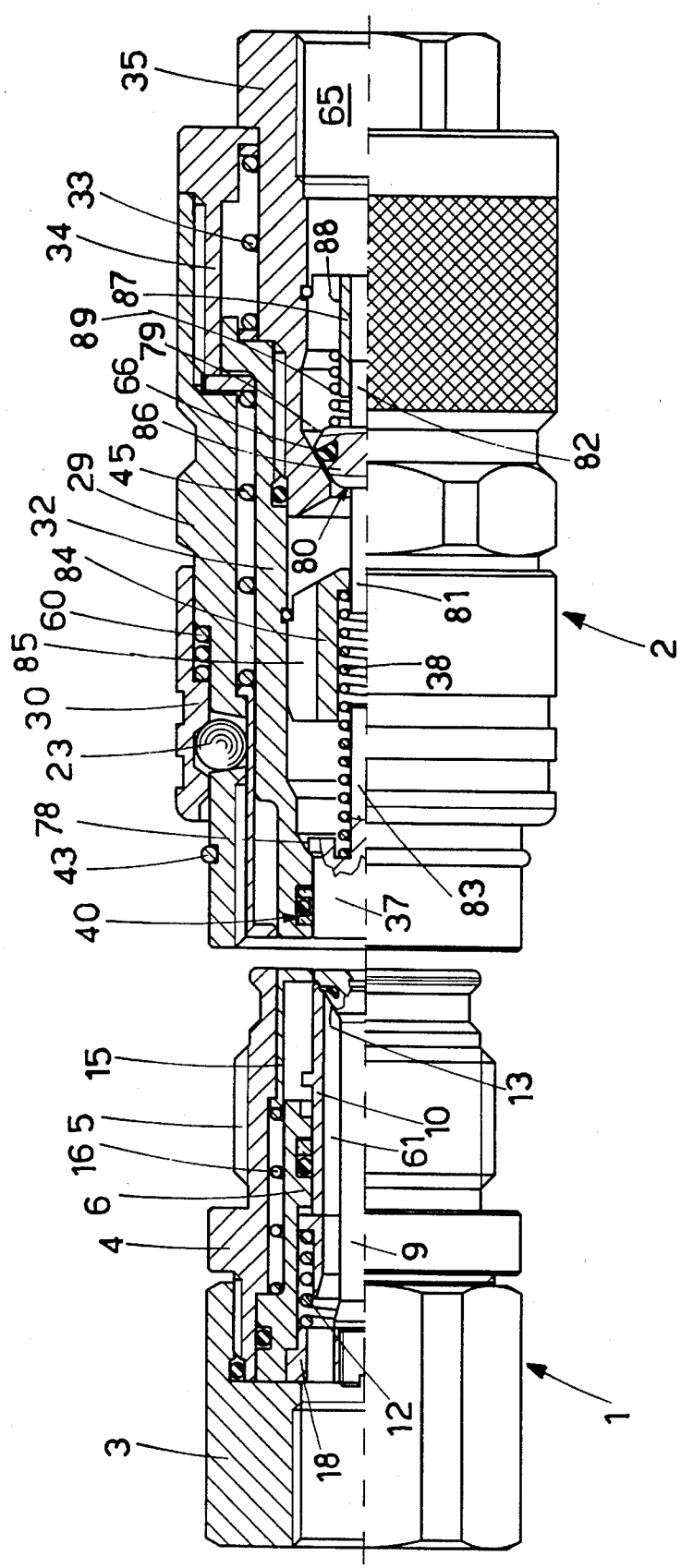
FIG. 6 is a front view, partially sectioned longitudinally, of a female element and of a male element of a variant of the fitting according to the invention.
Figure 7:
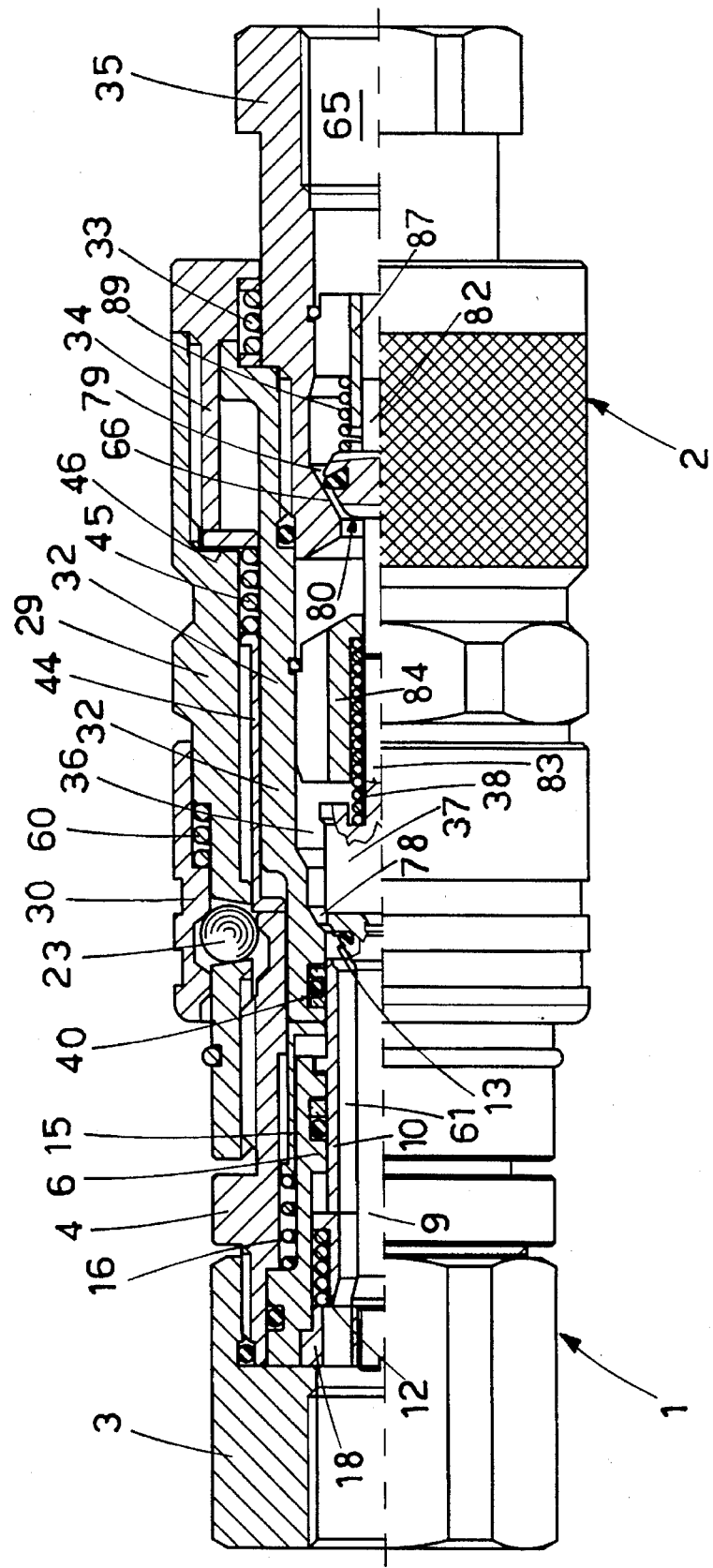
FIG. 7 is a front view, partially sectioned longitudinally, of the fitting of FIG. 6, in an intermediate stage of the coupling movement.
Figure 8:
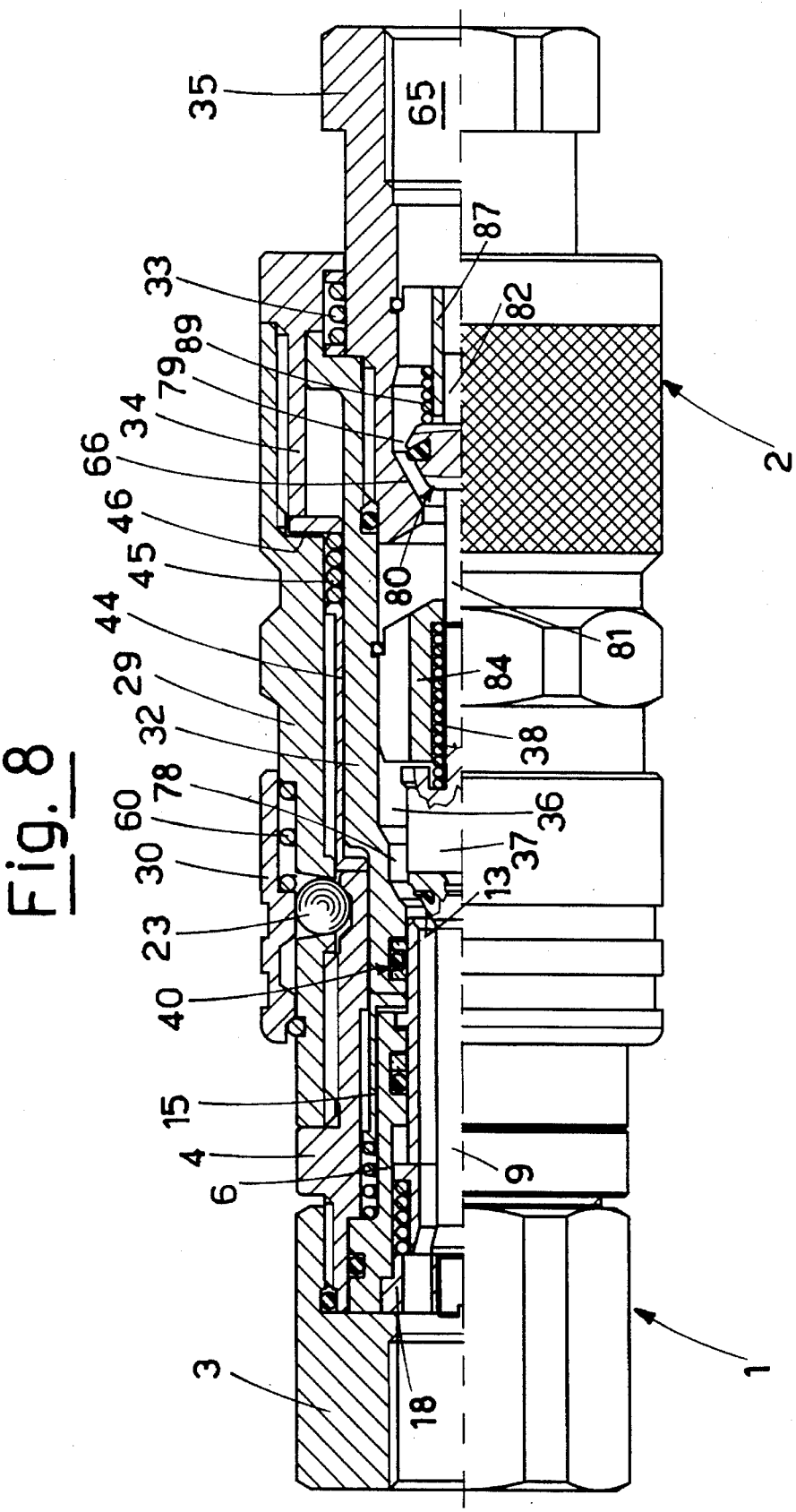
FIG. 8 is a front view, partially sectioned longitudinally, of the fitting of FIG. 6 with the two male and female elements coupled and locked together.

There is shown in FIGS. 6–8 a variant of the fitting shown in FIGS. 1–5, wherein the same parts are indicated with the same numbers.

In this case, the male element 2 has a mushroom valve 80 with a head 86 and two stems 81 and 82. The piston 37 has a shank 83 that interacts with the stem 81 of the valve 80 and is axially slidably supported by a fixed annular element 84, with ports 85 for the passage of the fluid, through the intermediary of the spring 38. The valve 80 is axially slidably supported by the annular element 84 and by a second fixed annular element 87 with ports 88 for the passage of the fluid, through the intermediary of a spring 89. At rest (FIG. 6), the valve 80 is kept up against the frustum-shaped shoulder 66 of the nut 35.

Assembling the fitting of FIGS. 6–8 is altogether the same as that of the fitting of FIGS. 1–5. In the final screwing up stages of the external casing 29, when the seal 40 is covered by the bush 10, the piston 37 opens the valve 80 through the thrust of its shank 83 on the stem 81 (FIGS. 7 and 8).

We claim:

1. Quick-coupling fitting for pipes, comprising a female element and a male element that can be coupled together, which elements are formed by fixed parts and axially sliding parts that when at rest are urged in closed positions in which the axially sliding parts close passage ports for the fluid in the female and male elements and when the two elements are coupled together said axially sliding parts are displaced by engagement with corresponding parts of the other element in open positions in which they cause said passage ports to open and communicate with each other, said axially sliding parts of the female element comprising a bush that is axially sliding and elastically urged toward the closed position and said fixed parts of the male elements comprising a fixed internal casing provided with a seal that can be covered by said bush of the female elements on the occasion of said coupling action, wherein said male element comprises valve means arranged in a supply conduit for the passage port of the male element to close said supply conduit in initial stages of said coupling actions and to open said supply conduit in final stages of said coupling action, and said seal is housed in a seat located in the proximity of one end of said internal casing facing said bush, so that said seal is covered by said bush in the initial stages of said coupling action and before said valve means opens said supply conduit.

2. Fitting according to claim 1, characterized in that said valve means are constituted by a mushroom valve comprising a stem and a head, said valve being capable of being engaged by an axially sliding piston apt for opening said passage port in said final stages of the coupling action.

3. Fitting according to claim 2, characterized in that said piston has a skirt axially slidably supported in a tubular element provided with a striker wall, integral with a terminal nut comprising said supply conduit, said stem of said valve being provided with an annular projection, first elastic means being interposed between said piston and said annular projection, second elastic means being interposed between said annular projection and said striker wall.

4. Fitting according to claim 3, characterized in that said head of said valve is kept up against a frustum-shaped shoulder integral with said terminal nut by said second elastic means, so as to close said communication port.

5. Fitting according to claim 4, characterized in that said frustum-shaped shoulder is provided with ports for the passage of the fluid.

6. Fitting according to claim 1, characterized in that said valve means are constituted by a mushroom valve comprising a head and two stems, said valve being capable of being engaged by an axially sliding piston apt for opening said passage port in said final stages of the coupling action.

7. Fitting according to claim 6, characterized in that said piston has a shank that interacts with one of said two stems of said mushroom valve and is axially slidably supported by an annular element, with ports for the passage of the fluid, through the intermediary of elastic means, said stems of said valve being axially slidably supported by said annular element and by a second annular element, with ports for the passage of the fluid, through the intermediary of second elastic means, said second elastic means keeping said valve in abutment against a frustum-shaped shoulder integral with a terminal nut comprising said supply conduit, so as to close said communication port.

8. Quick-coupling fitting for pipes, comprising a female element and a male element that can be coupled together, which elements are formed by fixed parts and axially sliding parts that when at rest are urged in closed positions in which the axially sliding parts close passage ports for the fluid in the female and male elements and when the two elements are coupled together said axially sliding parts are displaced by engagement with corresponding parts of the other element in open positions in which they cause said passage ports to open and communicate with each other, said axially sliding parts of the female element comprising a bush that is axially sliding and elastically urged toward the closed position and said fixed parts of the male elements comprising a fixed internal casing provided with a seal that can be covered by said bush of the female elements on the occasion of said coupling action, wherein said male element comprises valve means arranged in a supply conduit for the passage port of the male element to close said supply conduit in initial stages of said coupling actions and to open said supply conduit in final stages of said coupling action, and said seal is housed in a seat located in the proximity of one end of said internal casing facing said bush, so that said seal is covered by said bush in the initial stages of said coupling action and before said valve means opens said supply conduit, said valve means being constituted by a mushroom valve comprising a stem and a head, said valve being capable of being engaged by an axially sliding piston apt for opening said passage port in said final stages of the coupling action, wherein said piston has a skirt axially slidably supported in a tubular element provided with a striker wall, integral with a terminal nut comprising said supply conduit, said stem of said valve being provided with an annular projection, first elastic means being interposed between said piston and said annular projection, second elastic means being interposed between said annular projection and said striker wall.

* * * * *